Oct. 10, 1950     A. H. GERHARDT     2,525,173
MOTOR MOUNTING
Filed Dec. 16, 1948
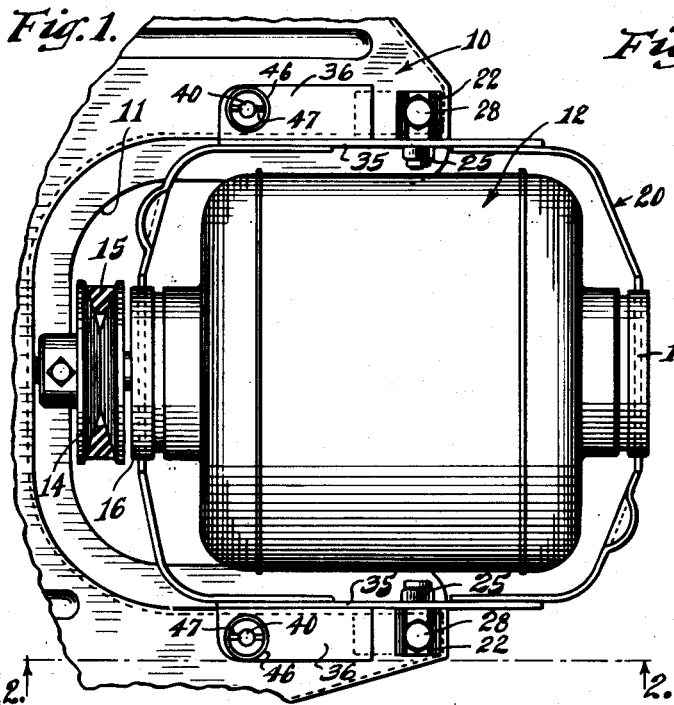
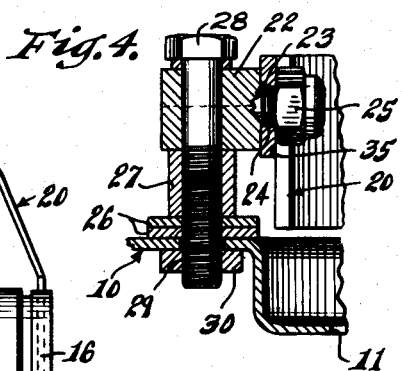
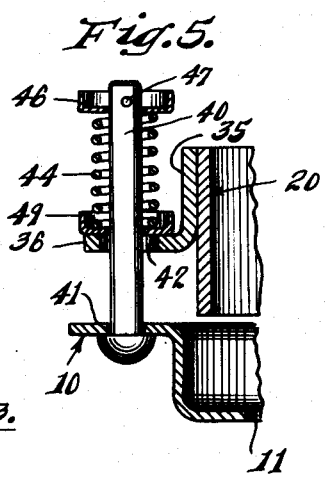
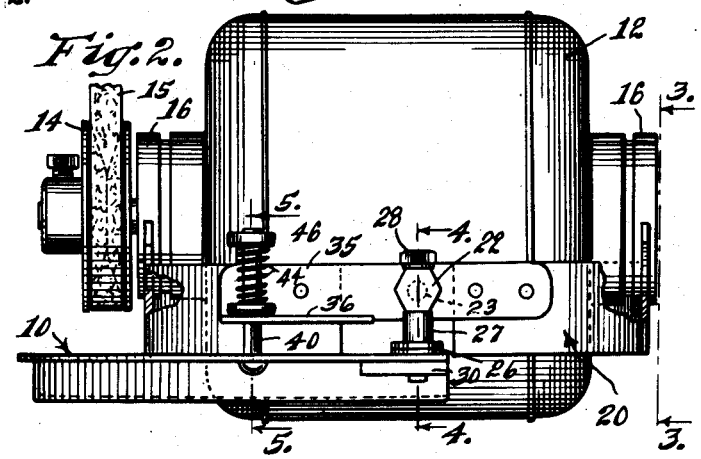
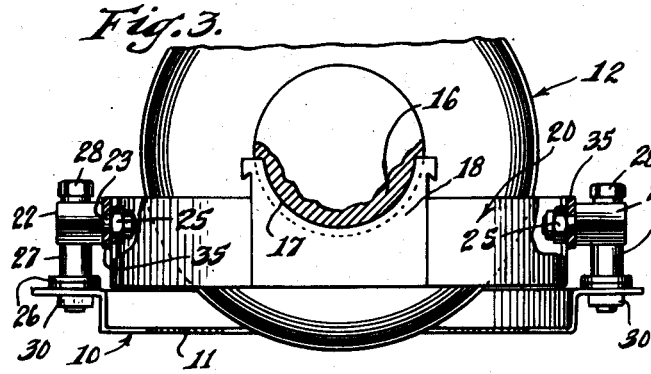
Inventor:
Andrew H. Gerhardt.
By A W Molinare
Atty.

Patented Oct. 10, 1950

2,525,173

UNITED STATES PATENT OFFICE 2,525,173

MOTOR MOUNTING

Andrew H. Gerhardt, Skokie, Ill., assignor to Thor Corporation, Chicago, Ill., a corporation of Illinois Application December 16, 1948, Serial No. 65,679

5 Claims. (Cl. 172—36)

This invention relates to a mounting for an electric motor, when arranged for driving other mechanism through the medium of pulleys and a belt. To insure an efficient drive from the motor, the usual practice heretofore has been to employ a suitable take-up device, which adds considerably to the total cost of the apparatus. In certain constructions, such as in present day washing machines, the motor and some or all of the driving mechanism are movably mounted to accommodate vibratory and gyratory movements of certain operating parts of the machine. It has been found that numerous difficulties result, as well as reduced efficiency in transmission of power, incident to inaccuracies in length, as well as width of tapered belts (sometimes called V belts) as well as slight inaccuracies in the pulleys employed.

The primary object of this invention is to provide a novel and improved mounting which permits quick and easy adjustment for initially and subsequently compensating for inaccuracies of the belts and pulleys employed in the transmission of power from the motor to the mechanism to be driven.

Another object is to provide novel and improved motor mounting which automatically imposes a predetermined tension or load on the drive belt, to insure an efficient drive.

A further object is to provide a novel and improved motor mounting wherein the motor is pivotally supported on a substantially horizontal axis, to one side of its center of gravity, and wherein resilient means is employed, in spaced relation to the axis of said pivotal mounting, tending to exert a predetermined force for rotating the motor about its pivotal mounting, to provide a counterbalance for the overhanging weight of the motor, together with means for rigidly locking the motor in fixed relation to its pivoted axis.

Still another object is to provide a novel and improved motor support which insures imposing of a predetermined load on the drive belt and which is fixed to maintain a desired tension therein, and which precludes possible stretching of the belt incident to handling or shipping of the piece apparatus of which the motor constitutes a part.

Other objects and advantages of the present invention will be apparent from the following description, taken in connection with the accompanying drawing in which:

Fig. 1 is a plan view of the novel motor mounting, embodying the present invention.

Fig. 2 is a view, part in elevation and part in section, taken substantially as indicated at line 2—2 on Fig. 1.

Fig. 3 is an outer end elevational view of the motor and the novel mounting therefor.

Fig. 4 is an enlarged vertical sectional view, through the pivotal mounting, taken substantially as indicated at line 4—4 of Fig. 2, and Fig. 5 is an enlarged vertical sectional view through the yieldable suspension for preloading the drive belt of the motor, taken substantially as indicated at line 5—5 of Fig. 2.

For convenience, the novel and improved motor mounting, embodying the present invention, as illustrated in the drawing, is shown as applied to an auxiliary frame of a domestic washing machine. The frame, which is indicated generally at 10, is preferably though not essentially so, formed as a sheet metal stamping, suitably reinforced with down turned flanges and embossed ribs. As may be seen in the drawing, the frame is formed with a generally U-shaped opening 11, to accommodate therein an electric motor, indicated generally at 12, so as to provide a compact arrangement and assembly. The drive end of the motor is provided with a driving pulley 14, which through the medium of a V belt 15, is adapted to drive a pulley associated with driving mechanism (not shown).

At opposite ends of the motor, there is provided an outboard bearing 16, formed with suitable grooves 17, for seating in generally semi-circular supports 18, disposed at the ends of a generally rectangular shaped cradle 20, which surrounds the motor 12. While I have herein shown the present invention in conjunction with a cradle, which in turn supports the motor, it will be apparent that the present invention may assume various other forms, and may be directly associated with the motor.

As may be seen in the drawing, the cradle and motor are supported on the frame 10, on a substantially horizontal axis, which, as may be seen in Fig. 2 of the drawing, extends transversely of the motor axis, and is located adjacent and slightly to one side of the center of gravity of the motor and cradle, the pivot axis being located at the end portion opposite the drive end of the motor. The pivotal mounting comprises two separate pivot units arranged at the respective sides of the motor, and each including a block 22, having a reduced end forming a trunnion 23, seated in an opening 24, formed in the side of the cradle 20, as may be seen in Fig. 4 of the drawing. The terminal end of the reduced portion or trunnion 23, projects a substantial distance through the cradle and is threaded for the reception of a self-locking nut 25, for purposes hereinafter described.

The pivot blocks 22 are each supported directly on the frame 10 and are shimmed to a desired height with respect to the frame to initially position the motor in proper correlation to the mechanism to be driven, in order to obtain proper tensioning of the drive belt 15. As may be seen in Fig. 4 of the drawing, each pivot block 22 is shimmed with respect to the frame by a multiplicity of washers 26, and a sleeve or bushing 27. The block, together with the washers and sleeve, are rigidly connected in assembled relation to the frame by means of a threaded stud 28, extending vertically through the assembly, with its lower end threaded into a tapped hole 29, formed in a plate 30, which is welded on the underside of the frame 10. Such a mounting of the blocks 22, permits of some lateral adjustment of the cradle and motor, so as to insure proper and free pivotal support of the cradle and motor on the trunnions 23.

Due to the location of the pivotal axis of the cradle and motor, which is the axis of the trunnions 23, the overhanging weight at the drive end of the motor causes the cradle and the motor to swing, at said end, in a downwardly direction.

At each side of the cradle is a connecting bar 35, which is provided with a horizontal extending leg 36, located intermediate the trunnion axis and the drive end of the motor. It is these bars 35, in which the trunnions 23 are journaled. Resilient suspension devices are provided at opposite sides of the motor and each of said devices comprises a headed pin 40, projecting upwardly through a large opening 41, in the frame 10, as seen in Fig. 5 of the drawing. The pin extends upwardly through and in spaced relation to the marginal edges of a relatively large circular opening 42, formed in the horizontal leg 36 of the bar 35 of the cradle. Surrounding the upper end of the pin 40, is a coil spring 44, the upper end of which reacts against an upwardly facing, cup-shaped washer 46, confined in position by a retaining pin 47, extending through the pin 40. The lower end of the spring abuts and seats against a similarly disposed cup-shaped washer 49, which is seated upon the horizontal leg of the connecting bar 35 of the cradle.

The purpose of the arrangement of the cup-shaped washer 46, together with the retaining pin 47, is to facilitate assembly and dis-assembly of the resilient suspension devices with respect to the cradle and supporting frame.

The spring suspension devices as described, are such that each of the springs 44, tend to exert a force in a downwardly direction, at the drive end of the motor, which is the same direction that the motor tends to rotate about its trunnion, due to the unbalanced overhanging weight thereof. Thus, normally, the springs 44 tend to supplement the overhanging weight of the drive end of the motor, and serve to impose a predetermined load or tension on the drive belt 15, so as to compensate for slight irregularities in length or width of the drive belt, as well as slight inaccuracies of the pulleys, for insuring maintenance of an efficient drive.

When initially adjusting the motor, for imposing a load on the drive belt, the self-locking nuts 25 are disengaged so as to permit free pivotal movement of the motor about the axis of the trunnions 23. Under such a condition, the overhanging unbalanced weight at the drive end of the motor tends to rotate the motor in a counter-clockwise direction, as seen in Fig. 2 of the drawing. This rotational movement of the motor is supplemented by the load of the springs 44, acting in the same direction.

It is to be understood that the springs 44 are of a predetermined size and form and serve to exert a predetermined force or load so that the drive belt 15 is placed under a predetermined load or tension. In other words, due to the construction described, the load or tension imposed on the drive belt will always be substantially constant and automatically imposed thereon when the belt is placed in proper position. When the belt 15 is under such a load, the nuts 25 are then tightened to firmly lock the cradle and motor with respect to the trunnions 23, thus locking the motor in such relation to the mechanism to be driven, so as to maintain a predetermined tension or load on the drive belt. It will be apparent that as a result of tightening the self-locking nuts 25, the action of the springs 44 is thereafter rendered ineffective.

By virtue of the construction described, it is now possible to quickly and easily mount and assemble the motor with respect to mechanism to be driven thereby, so as to automatically obtain a predetermined tension or load on the belt. Furthermore, the arrangement is such that the motor is maintained in a relatively rigid or fixed position with respect to the mechanism to be driven and thus insures against possible damage or stretching of the belt incident to handling or shipping of the total apparatus. If, at any time after the apparatus has been in operation, due to wear or other conditions necessitating adjustment of the belt to insure maintenance of the desired tension in the belt, correction is readily effected, and the desired tension or load on the belt is automatically obtained by merely loosening the nuts 25 and then tightening them. This is so, because as the nuts are loosened the springs 44 are then free to impose their full force on the motor, in addition to the unbalanced overhanging weight at the drive end thereof, tending to rotate the motor and thereby tensioning the belt to a predetermined value.

Although I have herein shown and described a certain and preferred embodiment of my invention, manifestly it is capable of modification and re-arrangement of parts without departing from the spirit and scope thereof. I do not, therefore, wish to be understood as limiting this invention to the precise embodiment herein disclosed, except as I may be so limited by the appended claims.

I claim:

1. In combination, a drive motor, means serving as a mounting for said motor comprising a pair of trunnions having journal connection with the motor and serving to initially provide a pivotal support for the motor about a substantially horizontal axis, spring means spaced from said trunnions and acting on said motor, and serving to exert a predetermined pressure to supplement the overhanging weight of the motor and tending to rotate said motor about said axis, and means for locking said trunnions and motor in fixed relation and thereby rendering said springs ineffective.

2. In combination, a drive motor, means serving as a mounting for said motor comprising a pair of trunnions having journal connections with said motor at opposite sides thereof, and serving to initially provide a pivotal support for the motor on an axis transversely of the motor axis, said pivot axis being located adjacent to one side of the center of gravity of the motor whereby to initially counterbalance the major portion of the overhanging weight of the opposite end of the motor, spring means spaced from said trunnions and acting on said motor and serving to exert a predetermined pressure on the motor, to supplement the overhanging weight of the motor and tending to rotate said motor about its pivot axis in the same direction as caused by the unbalanced weight of the motor, and means for firmly locking said trunnions and motor in fixed relation and thereby rendering said springs ineffective.

3. In combination, a drive motor having a driving pulley and an endless belt trained around said pulley, a pair of trunnions having journal connection with the motor to initially provide pivotal support for said motor about a substantially horizontal axis, means for initially imposing a predetermined load on the motor in a direction for imposing a predetermined tension in said belt, and means for locking the trunnions and motor in fixed relation with said tension imposed on the belt, and thereby rendering said first means inoperative.

4. In combination, a drive motor having a driving pulley and an endless belt trained around said pulley, a pair of trunnions having journal connection with the motor to initially provide pivotal support for said motor about a substantially horizontal axis, and means for locking the trunnions and motor in fixed relation after imposing a predetermined tension on the belt.

5. In combination, a drive motor having a driving pulley and an endless belt trained around said pulley, means serving as a mounting for said motor comprising a pair of trunnions having journal connections with said motor at opposite sides thereof, and serving to initially provide a pivotal support for the motor on an axis transversely of the motor axis, said pivot axis being located adjacent to one side of the center of gravity of the motor whereby to initially counterbalance the major portion of the overhanging weight of the opposite end of the motor, the overhanging weight of said opposite end of the motor serving to impose tension in the belt, and means for locking the trunnions and motor in fixed relation with said tension imposed on said belt.

ANDREW H. GERHARDT.

REFERENCES CITED

The following references are of record in the file of this patent:

UNITED STATES PATENTS

| Number | Name | Date |
|--------|------|------|
| 688,401 | Everett | Dec. 10, 1901 |